United States Patent
Koyama

(10) Patent No.: US 9,650,209 B2
(45) Date of Patent: May 16, 2017

(54) CONVEYING DEVICE

(71) Applicant: AIDA ENGINEERING, LTD., Kanagawa (JP)

(72) Inventor: Hitoshi Koyama, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 852 days.

(21) Appl. No.: 13/680,939

(22) Filed: Nov. 19, 2012

(65) Prior Publication Data

US 2013/0126313 A1    May 23, 2013

(30) Foreign Application Priority Data

Nov. 17, 2011 (JP) ................................ 2011-251267

(51) Int. Cl.
*B65G 15/12*     (2006.01)
*B65G 15/20*     (2006.01)
(Continued)

(52) U.S. Cl.
CPC ............... *B65G 15/12* (2013.01); *B23Q 7/03* (2013.01); *B65G 21/12* (2013.01)

(58) Field of Classification Search
None
See application file for complete search history.

(56) References Cited

U.S. PATENT DOCUMENTS

| 5,531,580 A * | 7/1996 | Bonino | B29C 49/56 |
| | | | 425/136 |
| 7,909,159 B1 * | 3/2011 | Zats | B65G 15/12 |
| | | | 198/586 |

(Continued)

FOREIGN PATENT DOCUMENTS

| DE | 19615025 C2 | 11/1998 |
| DE | 102010018791 A1 | 11/2011 |

(Continued)

OTHER PUBLICATIONS

Notification of Reasons for Refusal issued in Japanese Application No. 2011-251267 dated Apr. 11, 2014, w/English translation.

(Continued)

*Primary Examiner* — Kavel Singh
(74) *Attorney, Agent, or Firm* — McDermott Will & Emery LLP

(57) ABSTRACT

A conveying device includes annular continuous bodies each extending in a conveying direction of an object to be conveyed and each being rotationally driven, and a plate-like member extending in a conveying lateral direction and mounted on each of the annular continuous bodies. The conveying device conveys the object by placing the object on a conveying surface formed by the plate-like member, in which the plate-like member mounted on one of the annular continuous bodies. The plate-like member mounted on another of the annular continuous bodies, which is adjacent to the one of the annular continuous bodies, are arranged in a staggered manner without overlapping with each other when viewed from a direction orthogonal to the conveying surface. Adjacent two of the annular continuous bodies have an interval therebetween in the conveying lateral direction. The interval is expandable and contractable.

9 Claims, 11 Drawing Sheets

(51) Int. Cl.
*B23Q 7/03* (2006.01)
*B65G 21/12* (2006.01)

(56) References Cited

U.S. PATENT DOCUMENTS

| | | | | |
|---|---|---|---|---|
| 2003/0159906 A1* | 8/2003 | Rinks | ................... | B65G 15/12 |
| | | | | 198/586 |
| 2011/0139582 A1* | 6/2011 | Herrmann | ............... | B65G 15/44 |
| | | | | 198/572 |
| 2012/0186949 A1* | 7/2012 | Gentz | ................... | B65G 15/52 |
| | | | | 198/817 |

FOREIGN PATENT DOCUMENTS

| JP | 51-022284 | 2/1976 |
|---|---|---|
| JP | 55-101809 | 12/1978 |
| JP | 60-36918 | 3/1985 |
| JP | 4-49106 A | 2/1992 |
| JP | 9-225571 A | 9/1997 |
| JP | 2007-217085 A | 8/2007 |

OTHER PUBLICATIONS

Office Action German Patent Application No. 10 2012 110 954.0 dated Feb. 25, 2016.

\* cited by examiner

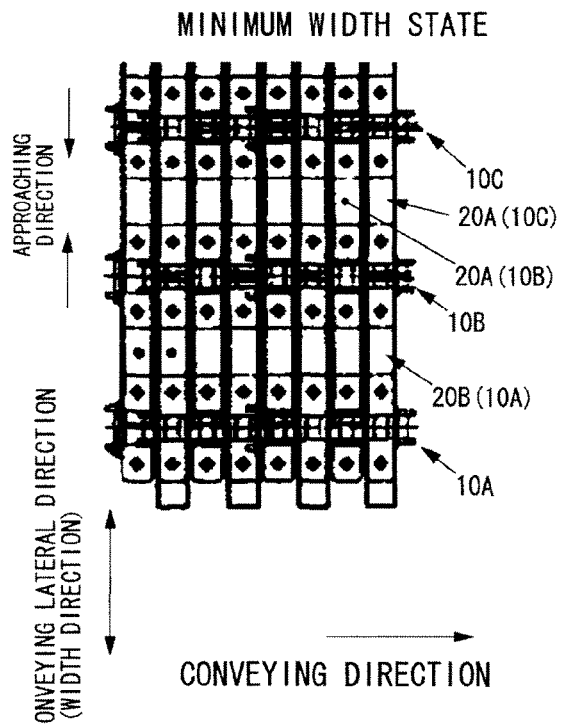
Fig. 4C
MINIMUM WIDTH STATE
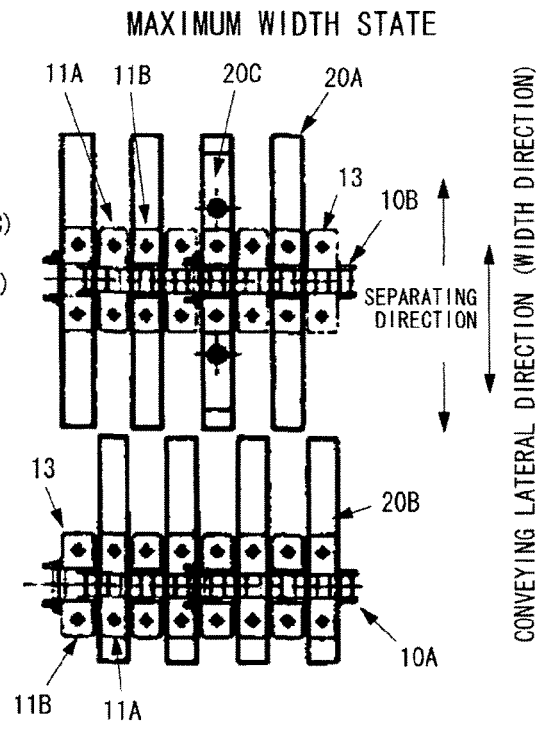
Fig. 4D
MAXIMUM WIDTH STATE
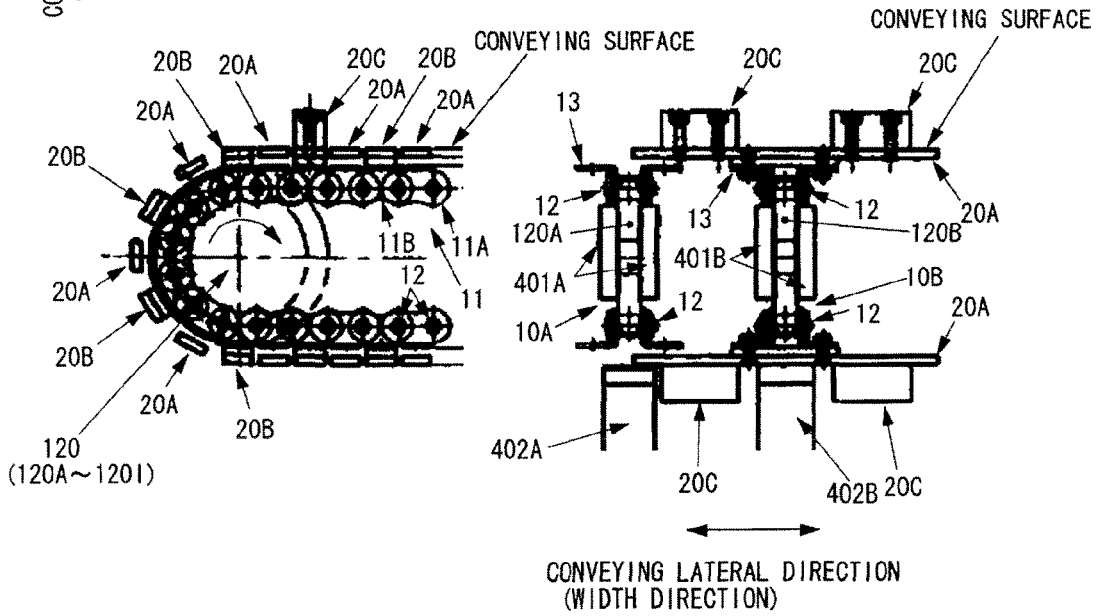
Fig. 4A
Fig. 4B

CONVEYING DIRECTION

CONVEYING DEVICE

RELATED APPLICATIONS

This application claims the benefit of Japanese Application No. 2011-251267, filed on Nov. 17, 2011 the disclosure of which Application is incorporated by reference herein.

FIELD OF THE INVENTION

The present invention relates to a conveying device (conveyor device) which conveys an object to be conveyed such as a workpiece.

BACKGROUND

Conventionally, various conveying devices for a workpiece have been proposed.

As one conveying device, for example, there is known a belt conveyor which conveys an object to be conveyed such as a workpiece by placing the object to be conveyed on an endless belt (annular belt) looped around a drive rotating body and a driven rotating body.

Further, for example, there is known a conveyor (conveying device) as illustrated in FIG. 9.

This conveyor is a so-called slat conveyor (slat conveyer). As illustrated in FIG. 9, on an outer periphery of an endless chain (annular chain) looped around a drive-side rotating body, such as a drive-side sprocket rotationally driven by an electric motor and the like, and a driven-side rotating body, such as a driven-side sprocket, a plurality of slats (plate-like members made of metal, resin, wood, etc.) each having a relatively narrow width are mounted so that a longitudinal direction of each slat is substantially orthogonal to a traveling direction of the endless chain (annular chain). The object to be conveyed such as a workpiece is placed on the slats to be conveyed.

In such a conveying device, when the size of the product to be conveyed (object to be conveyed such as a workpiece) is changed along with a change of the workpiece or the like, the conveyor width may be desired to be changed in accordance therewith in some cases.

In such cases, a plurality of conveyors are used, and the width-direction positions of the respective conveyors are changed, thereby enabling adjustment to the size of the object to be conveyed.

As an example of a device of this type, there is known a conveyor described in Japanese Utility Model Application Laid-Open No. S60-36918 (hereinafter referred to as Patent Literature 1).

The conveyor described in Patent Literature 1 is configured so that, as illustrated in FIG. 10, an interval between two belts 9 arranged in parallel to each other can be changed.

In the case of a conveyor of the type as described in Patent Literature 1, the sum of the widths of the plurality of belts (or slats) is the minimum width of the conveyor, and when it is desired that the width of the conveyor be increased to be larger than the minimum width, a parallel gap (parallel groove) extending along the longitudinal direction (conveying direction) of the conveyor is generated between one belt (or slat) and another belt (or slat) adjacent thereto.

Therefore, for example, the whole or part of one object to be conveyed may fall through the above-mentioned parallel gap to cause an unstable conveying state. Thus, the object to be conveyed may not be smoothly conveyed.

In order to avoid falling of the object to be conveyed through the parallel gap extending in the longitudinal direction as described above, in the conveyor described in Japanese Utility Model Application Laid-Open No. S55-101809 (hereinafter referred to as Patent Literature 2), as illustrated in FIG. 11, movable covers 4 and 5 and a fixed cover 6 are provided between two conveyor belts 1 and 2, and when the interval between the conveyor belts 1 and 2 is increased, the movable cover 4 integrated with the conveyor belt 1 and the movable cover 5 integrated with the conveyor belt 2 are moved on the fixed cover 6, thereby covering the parallel gap between the conveyor belts.

However, in the conveyor described in Patent Literature 2, when the width between the two conveyor belts 1 and 2 is desired to be decreased, the movable cover 4 and the movable cover 5 may interfere with each other, which hinders sufficient decrease of the width between the conveyor belts. Therefore, in an actual situation, a small object to be conveyed or the like cannot be satisfactorily conveyed.

Further, there is a relative speed difference between the conveying surfaces of the respective two conveyor belts 1 and 2 which move at a predetermined speed in the conveying direction, and the surfaces of the respective movable covers 4 and 5 which are fixed in the conveying direction. Therefore, when a part of the object to be conveyed supported by the conveying surfaces of the respective conveyor belts 1 and 2 is brought into contact with the surfaces of the movable covers 4 and 5, the object to be conveyed becomes unstable. Therefore, in an actual situation, the object to be conveyed cannot be smoothly conveyed.

SUMMARY OF THE INVENTION

The present invention has been made in view of the above-mentioned actual situations, and the present provides a conveying device having an easy and compact configuration at low cost, which is capable of changing a width of a conveying portion with a higher degree of freedom in accordance with the size change or the like of an object to be conveyed such as a workpiece, thereby being capable of stably and reliably conveying the object to be conveyed even when the size of the object to be conveyed is changed.

Thus, according to an exemplary embodiment of the present invention, there is provided a conveying device, including:

a plurality of annular continuous bodies each extending in a conveying direction of an object to be conveyed, the plurality of annular continuous bodies each being rotationally driven; and a plate-like member extending in a conveying lateral direction and mounted on each of the plurality of annular continuous bodies, the conveying device conveying the object to be conveyed by placing the object to be conveyed on a conveying surface formed by the plate-like member, in which the plate-like member mounted on one of the plurality of annular continuous bodies, and the plate-like member mounted on another of the plurality of annular continuous bodies, which is adjacent to the one of the plurality of annular continuous bodies, are arranged in a staggered manner without overlapping with each other when viewed from a direction orthogonal to the conveying surface, and in which adjacent two of the plurality of annular continuous bodies have an interval therebetween in the conveying lateral direction, the interval being expandable and contractable.

In the present invention, the conveying device may further include a rotating body around which a corresponding one of the plurality of annular continuous bodies is looped, and the interval between the adjacent two of the plurality of annular continuous bodies in the conveying lateral direction may be expandable and contractable by moving the rotating body along a direction of a rotation center axis of the rotating body.

In the present invention, the rotating body may move along the direction of the rotation center axis of the rotating body through intermediation of a ball screw mechanism engaging with an outer peripheral thread of a shaft extending in the conveying lateral direction.

In the present invention, the outer peripheral thread may include:

a right-handed thread portion obtained by cutting a right-handed thread in an outer periphery of one shaft; and a left-handed thread portion obtained by cutting a left-handed thread in the outer periphery of the one shaft.

The right-handed thread portion and the left-handed thread portion may each engage with the ball screw mechanism.

Further, the two ball screw mechanisms may move to approach each other when the one shaft is rotated in one direction, and the two ball screw mechanisms may move to separate from each other when the one shaft is rotated in a reverse direction.

In the present invention, the one shaft may include a plurality of shafts, and the plurality of shafts may be rotationally driven by a common drive shaft.

According to the present invention, it is possible to provide the conveying device having an easy and compact configuration at low cost, which is capable of changing the width of the conveying portion with a higher degree of freedom in accordance with the size change or the like of an object to be conveyed such as a workpiece, thereby being capable of stably and reliably conveying the object to be conveyed even when the size of the object to be conveyed is changed.

BRIEF DESCRIPTION OF THE DRAWINGS

In the accompanying drawings:

FIG. 4A is an enlarged view of a driven sprocket portion of the conveying device according to the embodiment of the present invention;

FIG. 4B is a side view of FIG. 4A;

FIG. 4C is a top view of the conveying surface (minimum width state) of the conveying device according to the embodiment of the present invention as viewed from above;

FIG. 4D is a top view of the conveying surface (maximum width state) of the conveying device according to the embodiment of the present invention as viewed from above;

DETAILED DESCRIPTION OF THE PREFERRED EMBODIMENTS

In the following, an embodiment representing an example of the present invention is described with reference to the accompanying drawings. Note that, the present invention is not limited by the embodiment described below.

A conveying device according to this embodiment is a conveying device which conveys an object to be conveyed that is an article such as a workpiece, and is applicable as a workpiece conveying device of a press machine (pressing machine), for example.

Note that, when the conveying device according to this embodiment is used as a workpiece conveying device of the press machine (pressing machine), the workpiece is received/passed from/to the conveying device by, for example, a workpiece conveying device employing a swinging arm system, which conveys the workpiece by swinging an arm set to a column or the like provided between the pressing machines, or a workpiece conveying device employing a feed bar system, which conveys the workpiece by horizontally reciprocating a feed bar which is supported by a rail or the like mounted between the pressing machines. The arm or the feed bar is provided with a vacuum cup or the like, which holds the workpiece in a removable manner by vacuum suction (or magnetic suction). The vacuum cup releases or sucks the workpiece at a predetermined position of a conveying portion of the conveying device according to this embodiment to receive or pass the workpiece.

Figure 1:
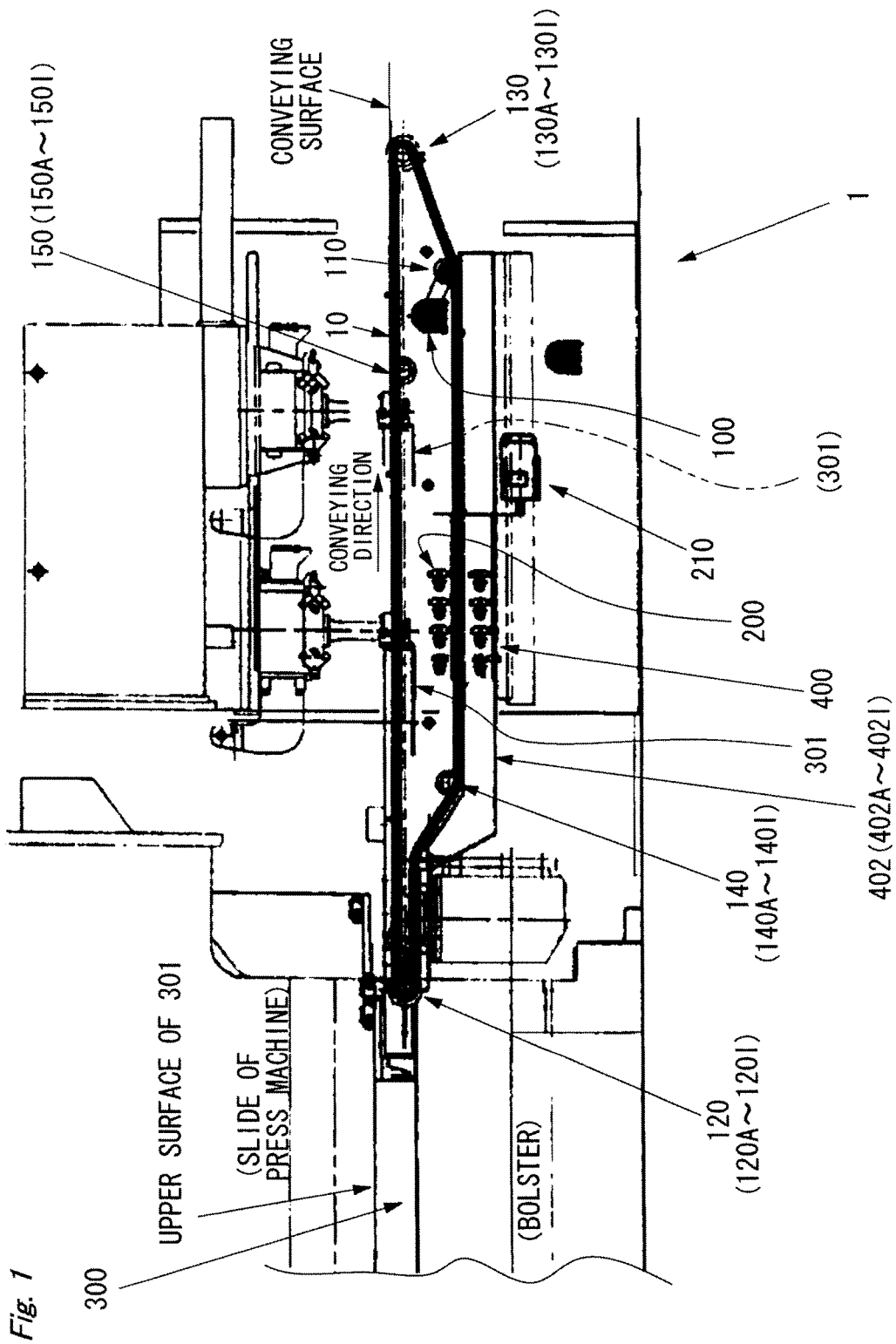
FIG. 1 is a front view schematically illustrating an overall configuration of a conveying device according to an embodiment of the present invention.
Figure 2:
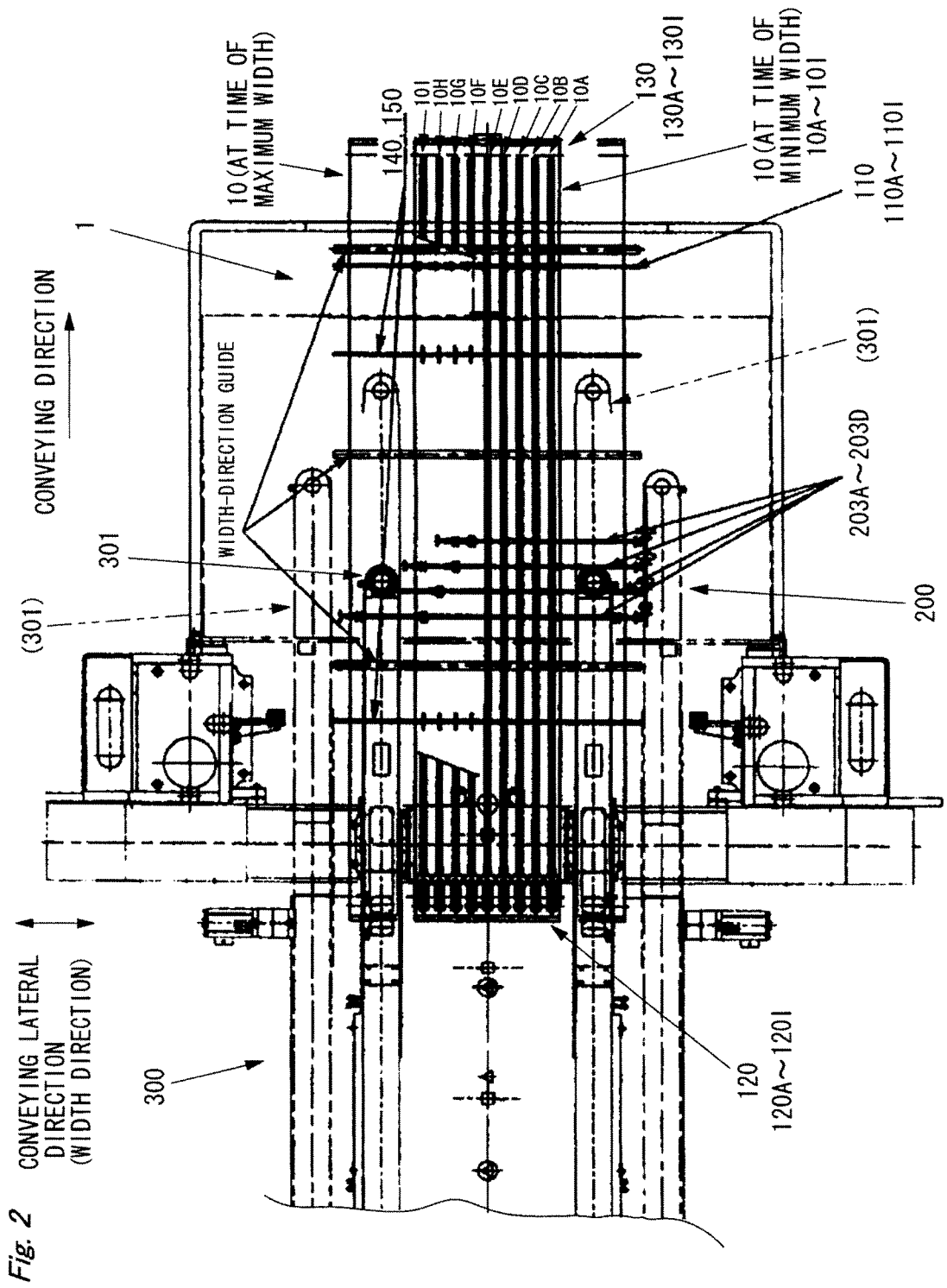
FIG. 2 is a top view of the conveying device according to the embodiment of the present invention as viewed from above.
Figure 3:
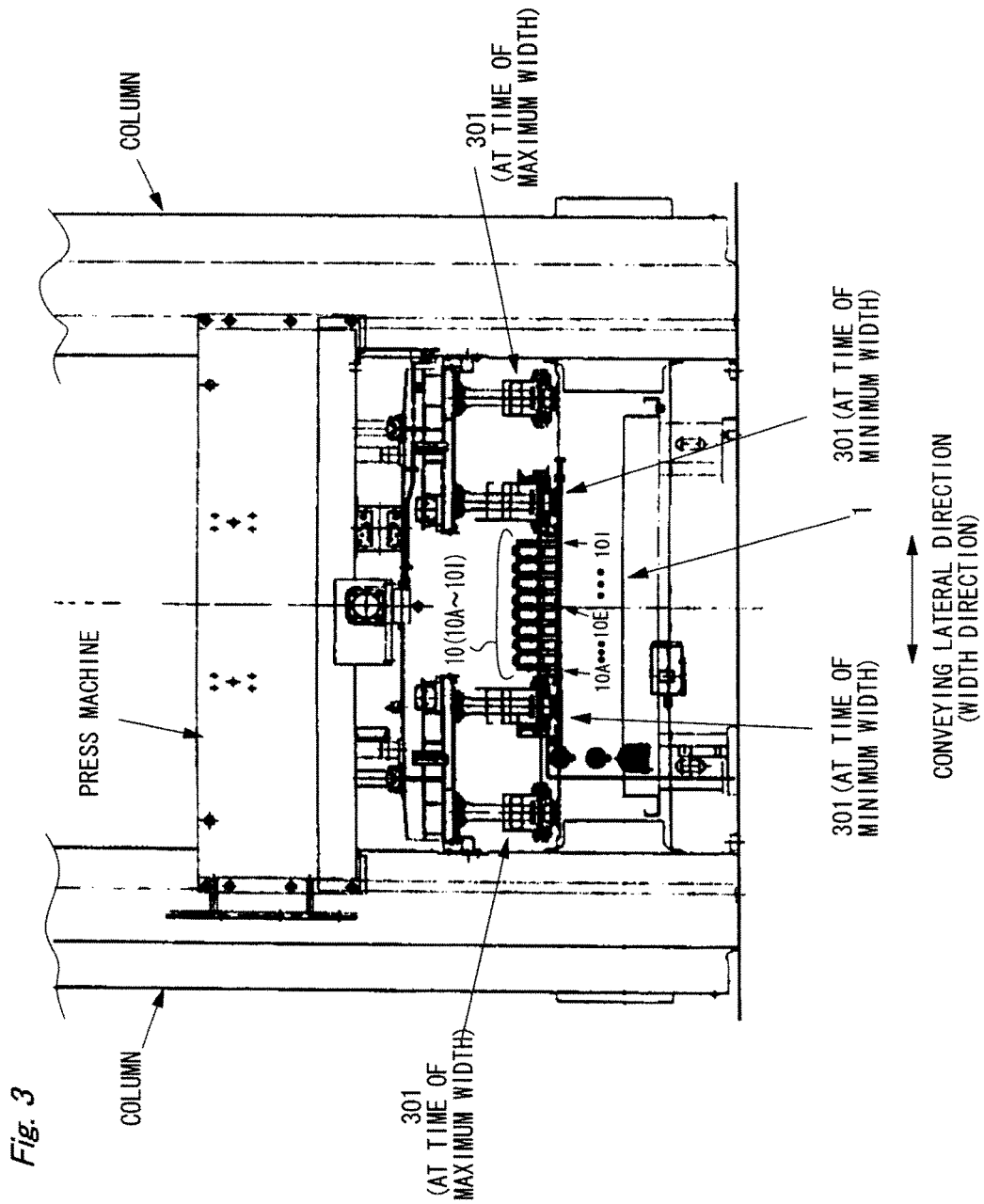
FIG. 3 is a side view of the conveying device according to the embodiment of the present invention as viewed from a conveying direction.

In FIGS. 1 to 3, there is used a workpiece conveying device 300 employing a feed bar system, which conveys a workpiece (object to be conveyed) by horizontally reciprocating a feed bar 301.

As illustrated in FIGS. 1 and 2, the conveying device 1 according to this embodiment includes an endless chain (annular chain) 10 as an annular continuous body, which is looped around driven sprockets 120 and 130, a drive sprocket 110 rotationally driven by a drive motor 100 through intermediation of a timing belt or the like, and tensioners or idlers 140 and 150. Thus, the endless chain 10 is rotationally driven by the drive sprocket 110.

The endless chain 10 includes, as illustrated in FIGS. 2, 3, 5, and 6, nine endless chains (10A to 10I) arranged in parallel to each other. The endless chain 10 (10A to 10I) includes, as illustrated in FIG. 4A, link bodies 11 (inner link bodies 11A and outer link bodies 11B) connected in a chain manner through intermediation of pin members 12.

Figure 6:
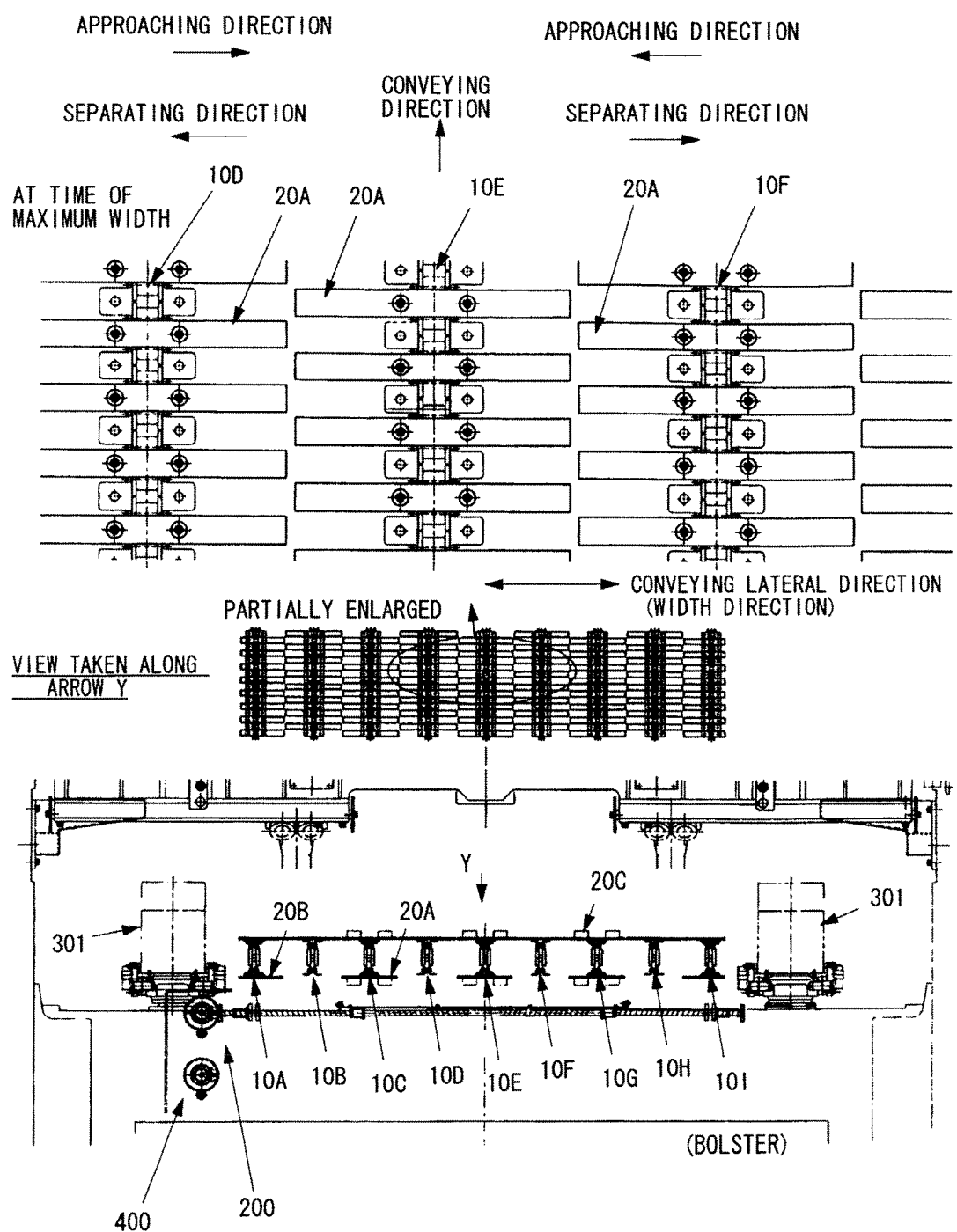
FIG. 6 is an enlarged view of the conveying portion including the endless chains and the slats of the conveying device according to the embodiment of the present invention in the maximum width state.

In this embodiment, as illustrated in FIGS. 4D, 6, etc., slats (plate-like members) 20 (20A or 20B) are mounted on outer peripheral parts of the plurality of link bodies 11 connected in a chain manner in every other link body through intermediation of attachments 13.

That is, in one endless chain, the slats (plate-like members) 20 (20A or 20B) are mounted on, of the link bodies 11 (inner link bodies 11A and outer link bodies 11B), for example, only one of each inner link body 11A and each outer link body 11B.

On the upper surfaces (conveying surfaces) of the slats 20 (20A and 20B) mounted on this endless chain 10, the object to be conveyed such as a workpiece is placed, and the object to be conveyed such as a workpiece is conveyed to a conveying-direction downstream side in FIGS. 1, 2, 4A to 4D, etc.

As illustrated in FIGS. 4A and 4B, on the upper surfaces of a part of the slats 20 (20A or 20B), projecting members 20C projecting on the conveying surface side are provided at predetermined intervals in the conveying direction, which engage with the object to be conveyed such as a workpiece to be placed to restrict slipping (relative displacement of the object to be conveyed with respect to the slats 20). Thus, the object to be conveyed such as a workpiece can be satisfactorily conveyed to the conveying-direction downstream side.

Note that, with respect to the endless chains 10A and 10I at both ends, the slats 20B extending longer to the side of the endless chains 10B to 10H (inner side) are mounted (see FIG. 4D).

Further, with respect to the endless chains 10B to 10H, the slats 20A extending almost equally toward both sides in the conveying lateral direction from the center of each endless chain are mounted (see FIG. 4D).

Further, the slats 20 mounted on each endless chain 10 (10A to 10I) are mounted so that the heights of the upper surfaces thereof are the same, to thereby form a conveying surface (surface on which the object to be conveyed is placed). Moreover, the slats 20 (20A and 20B) mounted on adjacent endless chains are arranged in an alternate and staggered manner so that the slats 20 do not interfere with each other or the like in the conveying direction, as clearly understood from FIGS. 4D, 6, etc.

In this embodiment, in order that the slats 20 (20A and 20B) mounted on the adjacent endless chains 10A to 10I do not interfere with each other or the like among the endless chains 10A to 10I, in one endless chain, the slats 20 are mounted on the plurality of link bodies 11 connected in a chain manner in every other link body (that is, mounted on any one of each inner link body 11A and each outer link body 11B). With this configuration, in one endless chain, the link bodies on which the slats 20 are mounted and the link bodies on which the slats 20 are not mounted are present alternately, and hence the slats 20 have a comb-teeth-like configuration in the one endless chain (see FIGS. 4D and 6).

The adjacent endless chains (10A to 10I) are arranged so that the comb teeth thereof mesh each other. In this manner, the adjacent endless chains (10A to 10I) can approach each other in a length equal to or smaller than the length of the slat 20 in a direction substantially orthogonal to the conveying direction while preventing the slats 20 from interfering with each other (see FIGS. 4C and 5).

Further, while preventing generation of the parallel gap (parallel groove) extending along the longitudinal direction (conveying direction) of the endless chains (10A to 10I), the adjacent endless chains (10A to 10I) may be separated from each other from the state of FIG. 4C (see FIGS. 4D and 6).

Figure 5:
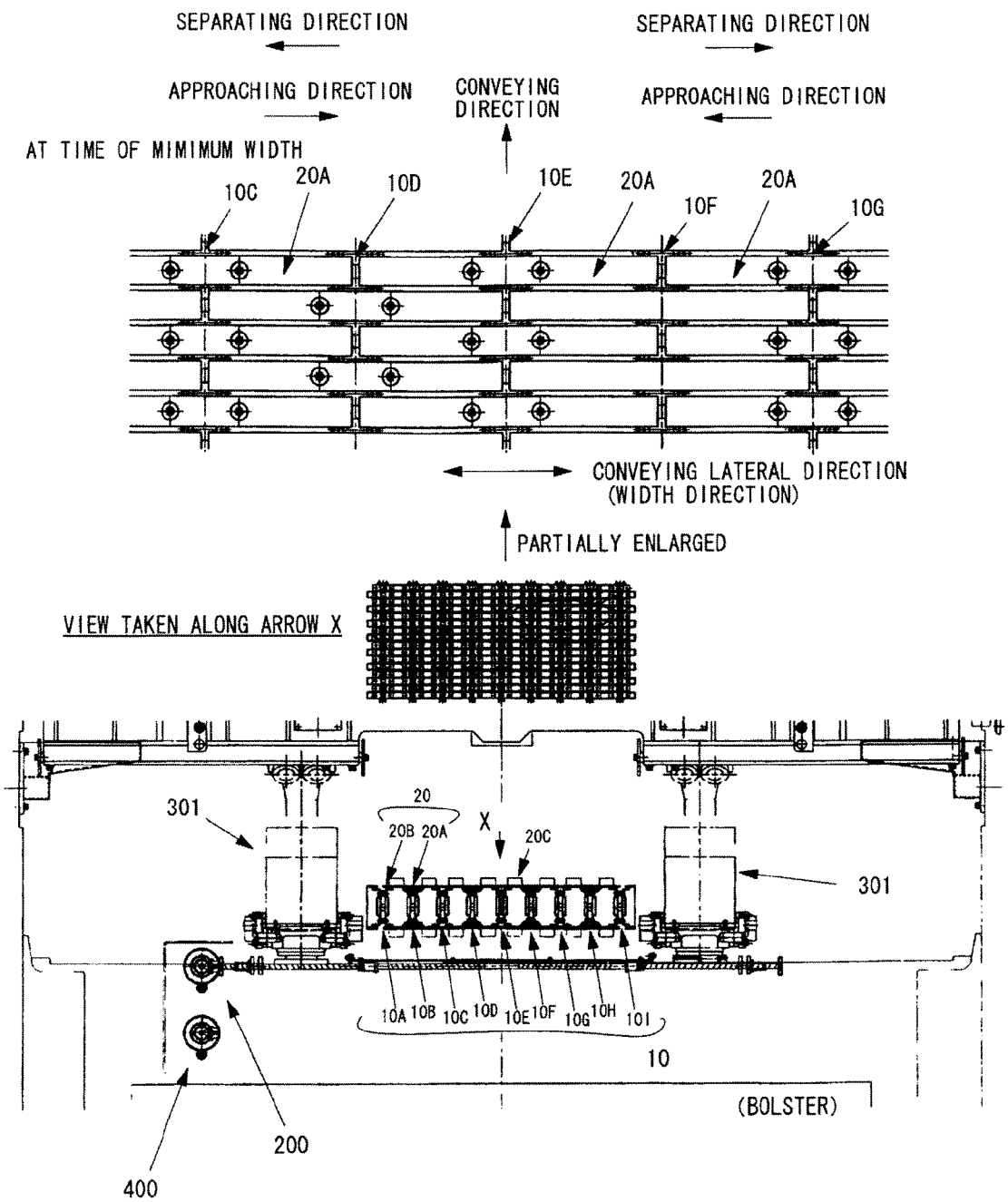
FIG. 5 is an enlarged view of a conveying portion including endless chains and slats of the conveying device according to the embodiment of the present invention in the minimum width state.

With use of this mechanism, in this embodiment, as illustrated in FIGS. 4C and 5, leading ends of the slats 20 mounted on one endless chain may approach leading ends of the slats 20 mounted on another endless chain in a direction substantially orthogonal to the conveying direction in a range that the leading ends of the slats 20 mounted on the one endless chain do not interfere with the leading ends of the slats 20 of the another endless chain and the like (corresponding to minimum width).

On the other hand, in this embodiment, as illustrated in FIGS. 4D and 6, the leading ends of the slats 20 mounted on the one endless chain may separate from the leading ends of the slats 20 mounted on the another endless chain in a direction substantially orthogonal to the conveying direction (conveying lateral direction) in a range that a parallel gap having a width equal to or larger than a predetermined length (that is, such a length that adversely affects the conveyance of the object to be conveyed), which extends along the longitudinal direction (conveying direction) of the endless chains (10A to 10I), is not formed between the one endless chain and the another endless chain (corresponding to maximum width).

Therefore, according to this embodiment, it is possible to prevent generation of the parallel gap having a width equal to or larger than a predetermined length, which extends along the conveying direction, and thus while enabling stable conveyance, the conveying lateral-direction width may be changed as appropriate from the minimum width to the maximum width.

That is, according to this embodiment, it is possible to provide a conveying device having an easy and compact configuration at low cost, which is capable of changing the conveying lateral-direction width (width of the conveying portion) with a higher degree of freedom in accordance with the size change of the object to be conveyed such as a workpiece, thereby being capable of stably and reliably conveying the object to be conveyed even when the size of the object to be conveyed is changed.

By the way, in such a change (expansion and contraction) of the conveying lateral-direction width, the width of expansion and contraction can be further increased by providing the plurality of endless chains in parallel to each other to obtain multi-rows.

Figure 7:
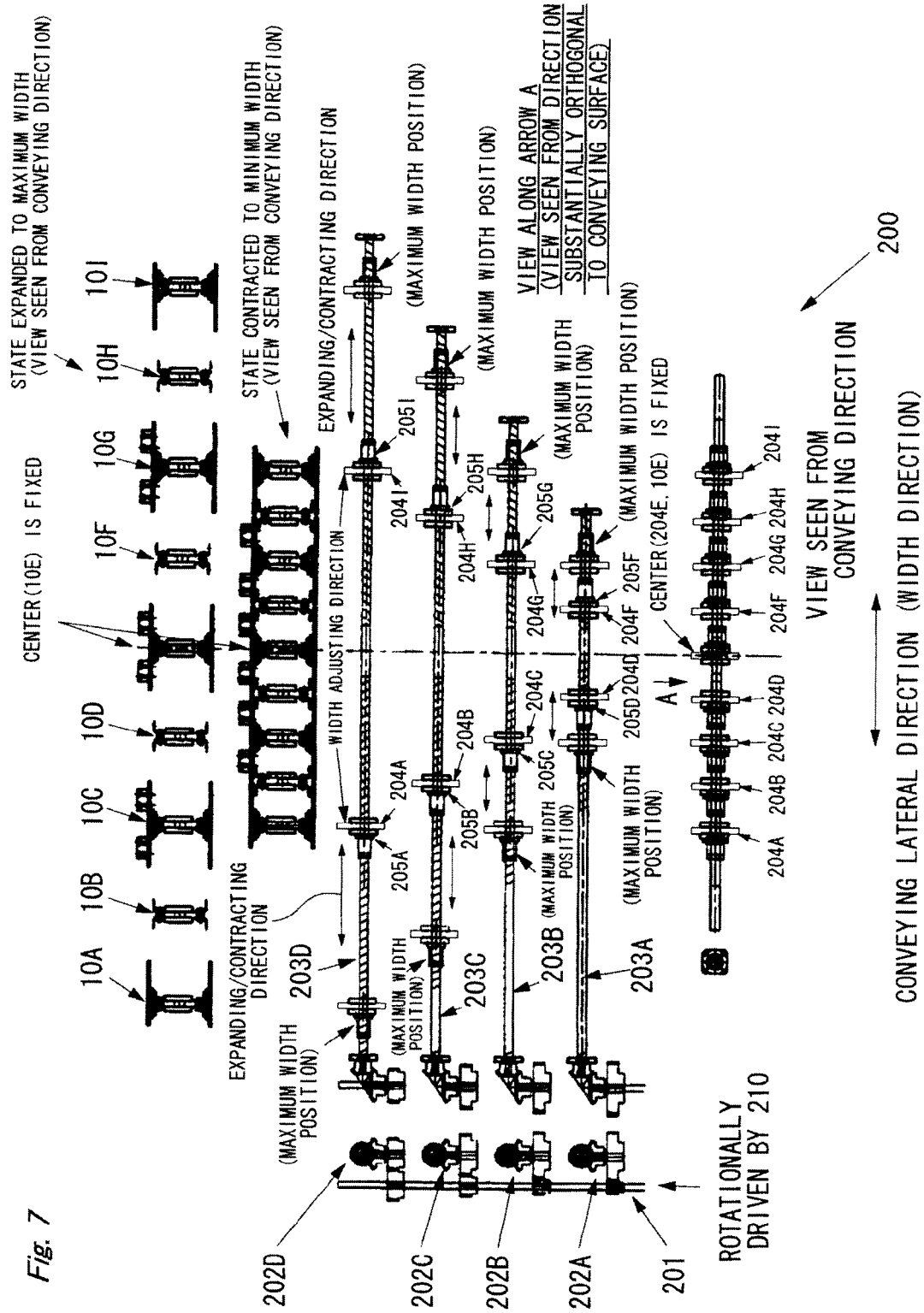
FIG. 7 is a view illustrating a structure of a conveying lateral-direction width changing mechanism of the conveying device according to the embodiment of the present invention.

Further, such a change of the conveying lateral-direction width may be achieved by using a conveying lateral-direction width changing mechanism 200 as illustrated in FIG. 7.

In the conveying lateral-direction width changing mechanism 200 of this embodiment, a drive shaft 201 is rotationally driven by one drive motor 210, and this rotation is transmitted to rotary screw shafts for expansion and contraction 203A to 203D through intermediation of respective gear transmission mechanisms 202A to 202D each including a bevel gear and the like.

Width adjusting sprockets 204D and 204F (corresponding to a rotating body of the present invention) which mesh with the link bodies 11 of the endless chains 10D and 10F adjacent to both sides of the center endless chain 10E are mounted to the rotary screw shaft for expansion and contraction 203A through intermediation of ball screw mechanisms 205D and 205F, respectively.

In this case, in the outer periphery of the rotary screw shaft for expansion and contraction 203A, threads (right-handed thread and left-handed thread) in different directions are cut on both sides with respect to the vicinity of the longitudinal center. Balls incorporated in the ball screw mechanisms 205D and 205F engage with the threads.

Therefore, when the rotary screw shaft for expansion and contraction 203A is rotated in a predetermined direction, in accordance therewith, the ball screw mechanism 205D moves on the rotary screw shaft for expansion and contraction 203A in a left direction of FIG. 7 from the minimum width state of FIG. 7 toward the maximum width direction. In addition, the ball screw mechanism 205F moves on the rotary screw shaft for expansion and contraction 203A in a right direction of FIG. 7 from the minimum width state of FIG. 7 toward the maximum width direction.

On the other hand, when the rotary screw shaft for expansion and contraction 203A is rotated in a direction opposite to the above-mentioned direction, in accordance therewith, the ball screw mechanism 205D moves on the rotary screw shaft for expansion and contraction 203A in the right direction of FIG. 7 toward the minimum width direction. In addition, the ball screw mechanism 205F moves on the rotary screw shaft for expansion and contraction 203A in the left direction of FIG. 7 toward the minimum width direction.

Then, in accordance therewith, the width adjusting sprockets 204D and 204F mounted to the ball screw mechanisms 205D and 205F in a freely rotatable manner move in the conveying lateral direction together with the ball screw mechanisms 205D and 205F, respectively. Therefore, the lower sides (see FIG. 7) of the endless chains 10D and 10F meshing with the width adjusting sprockets 204D and 204F move in the conveying lateral direction in association with the movement of the ball screw mechanisms 205D and 205F, respectively.

Note that, the driven sprockets 120 (120D and 120F) and 130 (130D and 130F), the idlers 140 (140D and 140F), and the like meshing respectively correspondingly to the endless chains 10D and 10F are mounted to support shafts respectively supporting those members in a freely movable manner in an axial direction (conveying lateral direction). Therefore, those members move along with the movement of the endless chains 10D and 10F in the conveying lateral direction in association with the movement of the ball screw mechanisms 205D and 205F.

Further, the drive sprockets 110 (110D and 110F) respectively corresponding to the endless chains 10D and 10F each engage with an outer periphery of a rotary drive shaft, which is rotationally driven by the drive motor 100, through ball spline engagement for transmitting the drive in the rotational direction, and the movement thereof in the rotational direction relative to the rotary drive shaft is restricted. However, the drive sprockets 110 (110D and 110F) move freely in the axial direction (conveying lateral direction), and hence similarly to the other sprockets, the drive sprockets 110 (110D and 110F) move along with the movement of the endless chains 10D and 10F, respectively, in the conveying lateral direction.

Such a mechanism is provided to each of the endless chains, and as illustrated in FIG. 7, the endless chains 10C and 10G are coupled to the rotary screw shaft for expansion and contraction 203B through intermediation of ball screw mechanisms 205C and 205G, respectively, in a movable state (freely expanding and contracting state) in the conveying lateral direction, the endless chains 10B and 10H are coupled to the rotary screw shaft for expansion and contraction 203C through intermediation of ball screw mechanisms 205B and 205H, respectively, in a movable state (freely expanding and contracting state) in the conveying lateral direction, and the endless chains 10A and 10I are coupled to the rotary screw shaft for expansion and contraction 203D through intermediation of ball screw mechanisms 205A and 205I in a movable state (freely expanding and contracting state) in the conveying lateral direction.

Note that, the endless chain 10E, the respective sprockets 120E, 130E, 140E, and 150E, and a width adjusting sprocket 204E, which are arranged in the middle (center) in the conveying lateral direction (width direction), are mounted in a fixed manner in the conveying lateral direction (width direction).

By the way, as the endless chain is located at a position separated from the middle in the conveying lateral direction (center), the distance to be moved in the conveying lateral direction by one rotation of the common drive shaft 201 is required to be larger. Therefore, in this embodiment, the rotary screw shaft for expansion and contraction 203A has the smallest thread pitch, and the pitches gradually increase in the order of the rotary screw shafts for expansion and contraction 203B, 203C, and 203D.

With this, by one rotation of the common drive shaft 201, each of the endless chains 10A to 10I (except for the fixed endless chain 10E at the center) moves in the conveying lateral direction by the necessary movement amount. Thus, intervals among the endless chains 10A to 10I in the conveying lateral direction, by extension, the conveying lateral-direction width of the conveying portion may be freely changed from the minimum width state illustrated in FIGS. 4C and 5 to the maximum width state illustrated in FIGS. 4D and 6.

Therefore, according to the conveying device 1 of the this embodiment, it is possible to prevent formation of a wide parallel gap extending continuously along the longitudinal direction (conveying direction) of the endless chains 10A to 10I during change between the minimum width state illustrated in FIGS. 4C and 5 and the maximum width state illustrated in FIGS. 4D and 6. Therefore, the conveyance of the object to be conveyed is not adversely affected, and the object to be conveyed can be stably conveyed while enabling change of the conveying surface width in accordance with the size of the object to be conveyed.

In this embodiment, in order to prevent the endless chains 10A to 10I from loosening on the lower side, as illustrated in FIG. 4B, there are provided guide members 401 (401A to 401I) for supporting the upper parts (conveying surface side) of the respective endless chains 10A to 10I from below in a freely slidable manner.

Therefore, also the guide members 401 (401A to 401I) need to move in association with expansion and contraction of the respective endless chains 10A to 10I in the conveying lateral direction (width direction).

Further, in this embodiment, in order to prevent lower parts (not the conveying surface side but a return side) of the endless chains 10A to 10I from loosening on the lower side as well, as illustrated in FIG. 4B, there are provided guide members 402 (402A to 402I) for supporting the lower parts of the respective endless chains 10A to 10I from below in a freely slidable manner.

In this embodiment, the projecting members 20C are provided on the upper surfaces of the slats 20 of the endless chains 10A to 10I, and hence as illustrated in FIG. 4B, the projecting members 20C are projected downward from the lower parts of the endless chains 10A to 10I.

Therefore, the projecting members 20C move in association with the expansion and contraction of the endless chains 10A to 10I in the conveying lateral direction (width direction). Therefore, in order to avoid interference, also the guide members 402 (402A to 402I) need to move in association with expansion and contraction of the endless chains 10A to 10I in the conveying lateral direction (width direction).

In this context, in this embodiment, there is provided a conveying lateral-direction width changing mechanism 400 for moving the guide members 401 (401A to 401I) and the guide member 402 (402A to 402I) in the conveying lateral direction (width direction).

The conveying lateral-direction width changing mechanism 400 may adopt a configuration similar to that of the conveying lateral-direction width changing mechanism 200, and may be configured so that the guide members 401 (401A to 401I) and the guide members 402 (402A to 402I) are supported by, instead of the respective width adjusting sprockets 204A to 204I illustrated in FIG. 7, respective ball screw mechanisms (405A to 405I) which are freely movable in the width direction.

Note that, a drive source for the conveying lateral-direction width changing mechanism 400 may be provided independently and separately from that for the conveying lateral-direction width changing mechanism 200, but from the viewpoint of configuration simplicity and easiness of synchronization control, the drive motor 210 for the conveying lateral-direction width changing mechanism 200 may be used as the drive source in common.

By the way, when, as illustrated in FIGS. 1 to 3, the workpiece conveying device 300 employing a feed bar system is employed as a device for receiving/passing the object to be conveyed such as a workpiece from/to the conveying device 1 according to this embodiment, the workpiece (object to be conveyed) is conveyed by reciprocating, in the conveying direction, the feed bar 301 for carrying-in or carrying-out the workpiece with respect to the pressing machine or the like. A vacuum cup or the like mounted to the feed bar 301 holds the object to be conveyed such as a workpiece in a removable manner and releases or sucks the workpiece at a predetermined position to receive or pass the workpiece.

Then, when the size of the workpiece is changed, the feed bar 301 of the workpiece conveying device 300 is moved in the right-left direction of FIG. 3 in accordance with the size change of the workpiece. Therefore, in accordance therewith, the conveying lateral-direction width of the conveying device 1 arranged between a pair of the feed bars 301 needs to be changed.

That is, as in press working, when various processing including reception/passage and conveyance of the workpiece is performed in cooperation with various devices in a plurality of steps, it is presumed a case where the conveying width of the conveying portion of the conveying device 1 is demanded to be changed in accordance with the size change of the workpiece in view of the relationship to the other devices. According to the conveying device 1 of this embodiment, such a demand can be supported.

As described above, according to this embodiment, it is possible to change the conveying lateral-direction width (width of the conveying portion) from the minimum width to the maximum width as appropriate while enabling change of the conveying lateral-direction width with a higher degree of freedom in accordance with the size change or the like of the object to be conveyed such as a workpiece without generating the parallel gap having a width equal to or larger than a predetermined length, which extends along the conveying direction, thereby achieving stable conveyance.

That is, according to this embodiment, it is possible to provide a conveying device having an easy and compact configuration at low cost, which is capable of changing the conveying lateral-direction width (width of the conveying portion) with a higher degree of freedom in accordance with the size change of the object to be conveyed such as a workpiece, thereby being capable of stably and reliably conveying the object to be conveyed even when the size of the object to be conveyed is changed.

Figure 8:
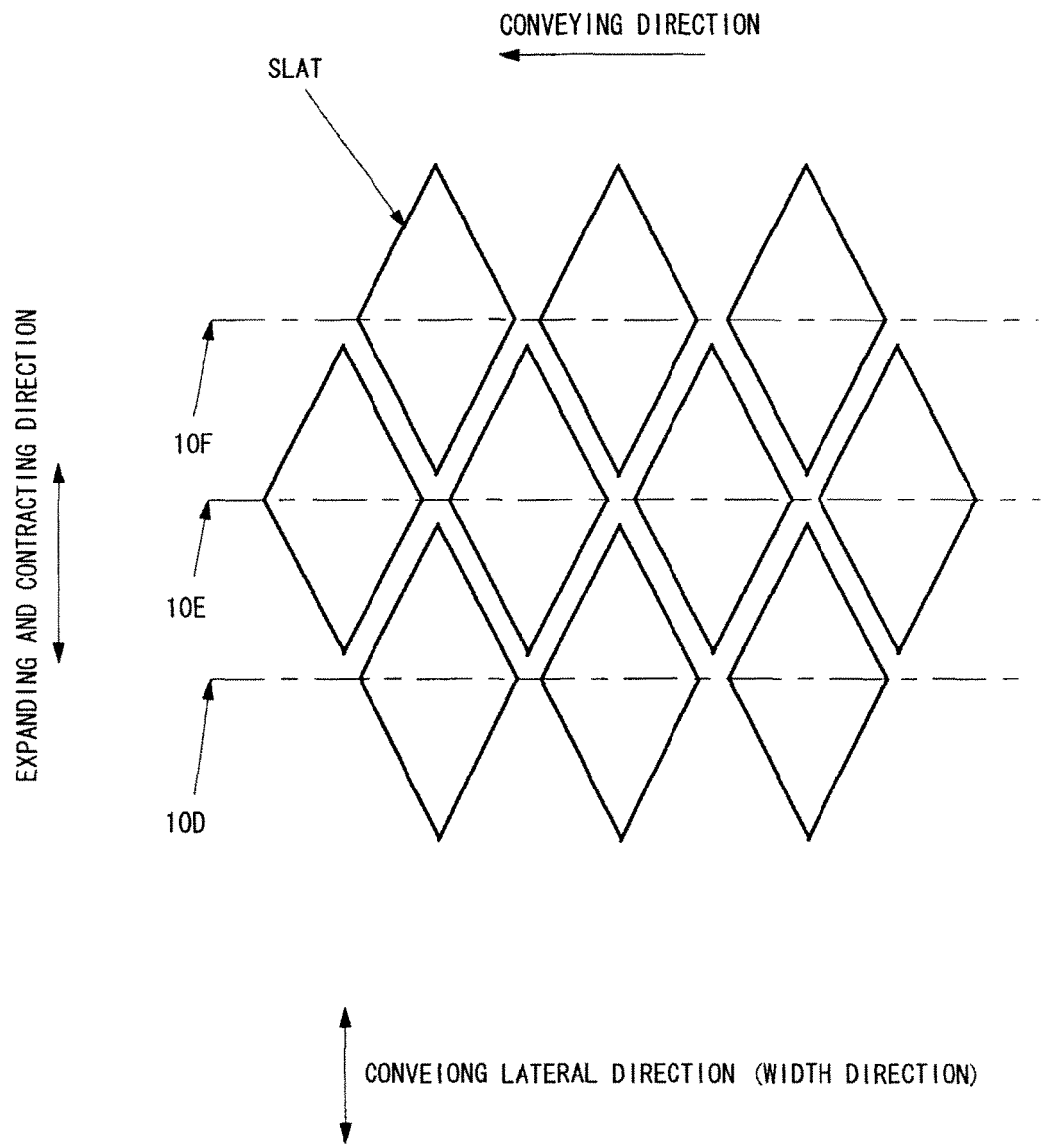
FIG. 8 is a top view illustrating an example of a slat shape of the conveying device according to the embodiment of the present invention.
Figure 9:
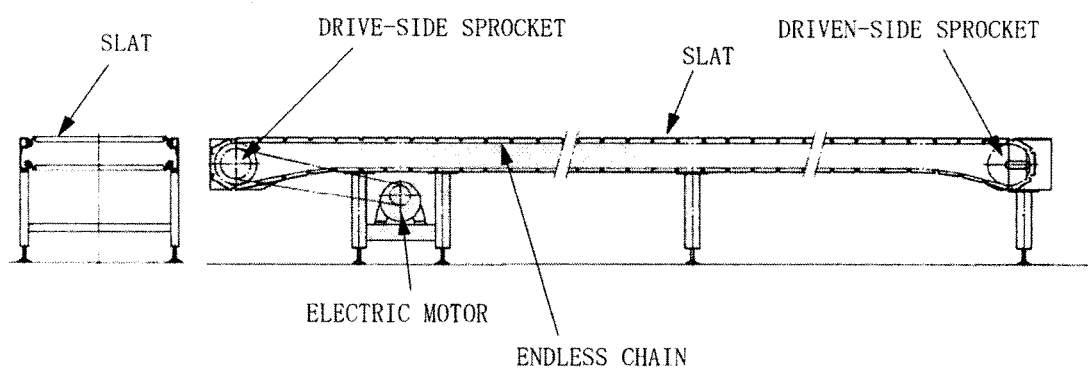
FIG. 9 is a view illustrating a configuration example of a conventional single-chain slat conveyor.
Figure 10:
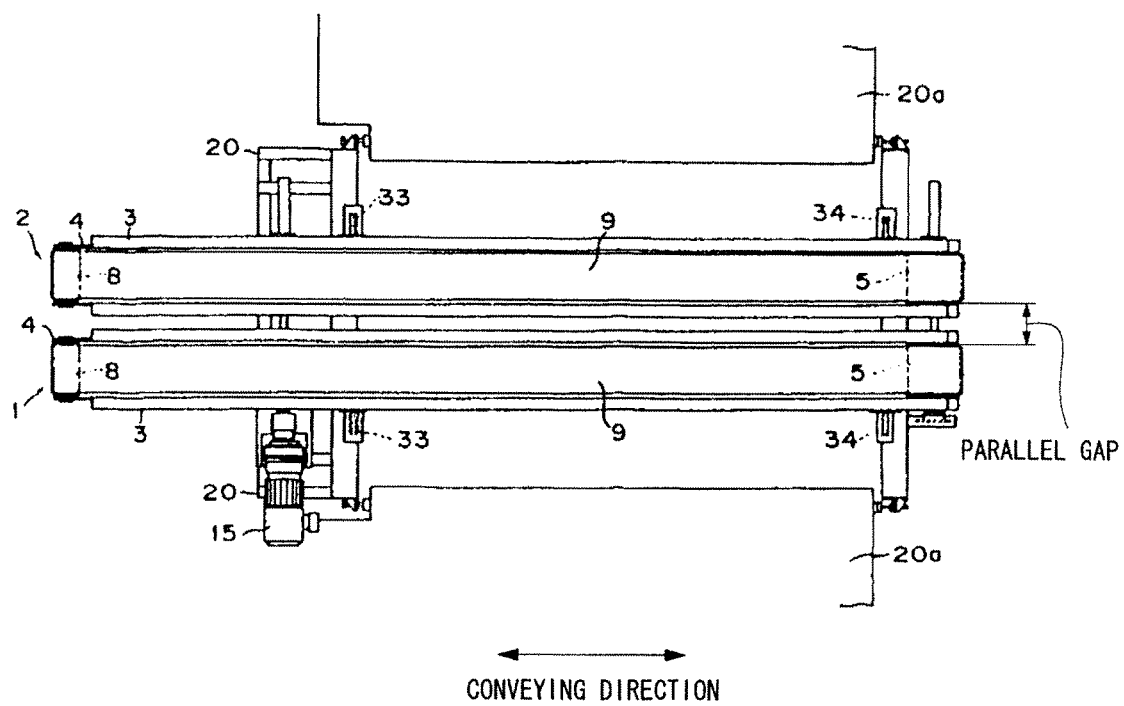
FIG. 10 is a view illustrating a configuration example of a conventional (Patent Literature 1) double-belt slat conveyor and a parallel gap (parallel groove)
Figure 11:
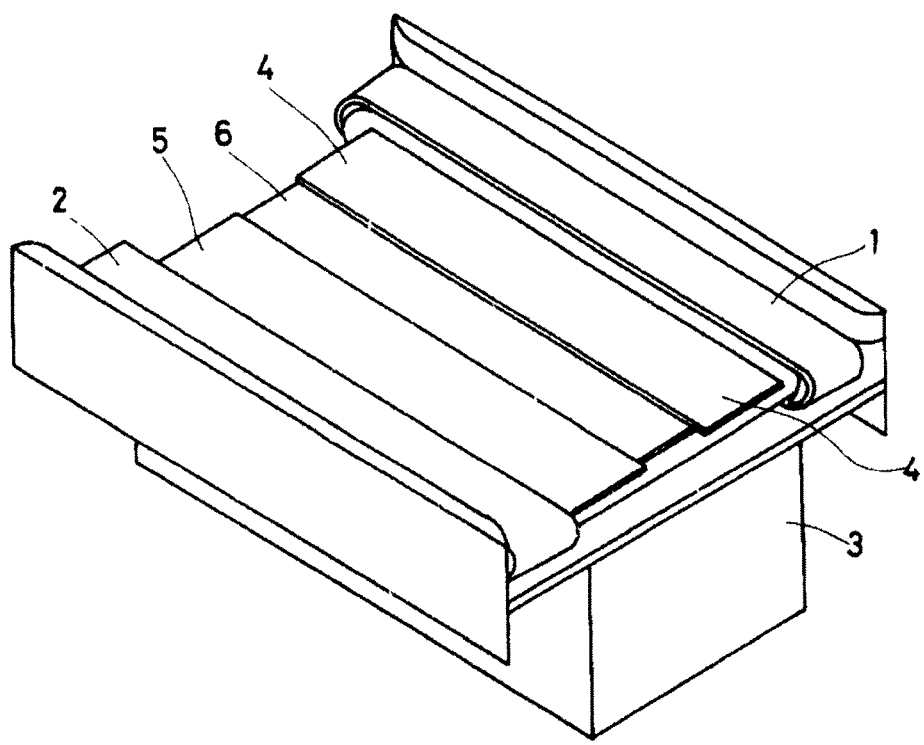
FIG. 11 is a perspective view illustrating a configuration example of a conventional (Patent Literature 2) slat conveyor provided in consideration of the parallel gap.

By the way, the slat 20 is not limited to be shaped into a rectangle as exemplified in FIGS. 4A to 6, and may have a rhombic shape as illustrated in FIG. 8, or other appropriate shapes.

Further, in this embodiment, the slats (plate-like members) 20 are mounted on the plurality of link bodies 11 connected in a chain manner in every other link body, but the present invention is not limited thereto. The following mounting form may be alternatively adopted. That is, a plurality of consecutive slats 20 are mounted to the link bodies 11 (inner link bodies 11A and outer link bodies 11B), and the same number of slats 20 are not consecutively mounted thereto.

Further, this embodiment describes the case where nine endless chains are arranged in parallel to each other as an example, but the present invention is not limited thereto. The present invention is applicable to a case where two or more endless chains are arranged in parallel to each other.

Further, in this embodiment, the endless chain is described as an example of a member forming the conveying portion (annular continuous body), but the present invention is not limited thereto. The present invention is also applicable to a case where an endless belt is adopted as the annular continuous body and the slats are mounted thereto in a zigzag manner.

Further, this embodiment exemplifies the case where the power of the drive motor 210 is used when the interval between the adjacent endless chains is changed, but the present invention is not limited thereto, and other types of power, such as human power, may be used.

Further, in this embodiment, the interval between the adjacent endless chains can be increased to an extent that one endless chain and another endless chain can be separated from each other so that, when the one endless chain is moved (turned) in the conveying direction, the one endless chain and the another endless chain are independently and freely moved (turned) without interfering with each other.

With such a configuration, at the time of maintenance or the like, operations such as independently moving (turning), removing, and replacing the plurality of endless chains can be easily performed one by one, and hence workability can be significantly improved.

The embodiments described above are merely examples for illustrating the present invention. Various changes are possible without departing from the gist of the present invention.

What is claimed is:

1. A conveying device, comprising:
   first and second annular continuous bodies each extending in a conveying direction of an object to be conveyed, the first and second annular continuous bodies each being rotationally driven and being arranged along a conveying lateral direction which is orthogonal to the conveying direction;
   a first slat mounted on the first annular continuous body, the first slat moving along the conveying direction in conjunction with the first annular continuous body;
   a second slat mounted on the second annular continuous body, the second slat moving along the conveying direction in conjunction with the second annular continuous body, and rotating bodies around which the first and second annular continuous bodies are respectively looped, the conveying device conveying the object, the object being placed on upper surfaces of the first and second slats, each of which having a length in the conveying lateral direction greater than a width of one of the first and second annular continuous bodies, wherein the first and second slats extend in the conveying lateral direction so as to respectively protrude from the first and second annular continuous bodies when viewed from a vertical direction orthogonal to both of the conveying direction and the conveying lateral direction, wherein the first and second slats are arranged in a staggered manner without overlapping with each other when viewed from the vertical direction, and wherein the first and second annular continuous bodies have an interval therebetween in the conveying lateral direction, the interval being expandable and contractable, wherein the interval between the first and second annular continuous bodies in the conveying lateral direction is expandable and contractable by moving the rotating bodies along a direction of a rotation center axis of the rotating bodies, wherein the rotating bodies move along the direction of the rotation center axis of the rotating bodies through intermediation of two ball screw mechanisms engaging with an outer peripheral thread of a shaft extending in the conveying lateral direction, wherein the outer peripheral thread comprises:
 a right-handed thread portion obtained by cutting a right-handed thread in an outer periphery of the shaft; and
 a left-handed thread portion obtained by cutting a left-handed thread in the outer periphery of the shaft,
 the right-handed thread portion and the left-handed thread portion each engaging with the two ball screw mechanisms, and wherein the two ball screw mechanisms move to approach each other when the shaft is rotated in one direction, and the two ball screw mechanisms move to separate from each other when the shaft is rotated in a reverse direction.

2. The conveying device according to claim 1,
wherein the shaft comprises a plurality of shafts, and
wherein the plurality of shafts are rotationally driven by a common drive shaft.

3. The conveying device according to claim 2, further comprising:
another shaft of the plurality of shafts which is different from the shaft, engaging with other two ball screw mechanisms,
third and fourth annular continuous bodies which respectively correspond to the other two ball screw mechanisms, the first and second annular continuous bodies being positioned between the third and fourth annular continuous bodies,
a third slat extending in the conveying lateral direction and mounted on the third annular continuous body so as to move along the conveying direction in conjunction with the third annular continuous body, the first and third slats being arranged in the staggered manner without overlapping with each other when viewed from a direction orthogonal to the conveying surface, and
a fourth slat extending in the conveying lateral direction and mounted on the fourth annular continuous body so as to move along the conveying direction in conjunction with the fourth annular continuous body, the second and fourth slats being arranged in the staggered manner without overlapping with each other when viewed from a direction orthogonal to the conveying surface,
wherein a thread pitch of right-handed and left-handed thread portions of the other shaft is greater than a thread pitch of the right-handed and left-handed thread portions of the shaft, and
wherein a movement distance of the other two ball screw mechanisms along the other shaft is greater than a movement distance of the two ball screw mechanisms along the shaft.

4. The conveying device according to claim 1, further comprising guide members disposed inside the first and second annular continuous bodies so as to slidably support the first and second annular continuous bodies.

5. The conveying device according to claim 1, wherein the first and second slats move in the conveying lateral direction in conjunction with the first and second annular continuous bodies.

6. The conveying device according to claim 1, wherein the first slat crosses over the first annular continuous body and the second slat crosses over the second annular continuous body.

7. The conveying device according to claim 1, wherein the first annular continuous body is positioned adjacent to the second annular continuous body.

8. The conveying device according to claim 1, wherein the first slat protrudes from both sides of the first annular continuous body and is attached to the first annular continuous body.

9. The conveying device according to claim 8, wherein one first slat is disposed between two second slat adjacent to the one first slat in the conveying direction.

* * * * *